July 23, 1968     T. L. HOWELL     3,393,647
PALLET AND METHOD OF MAKING SAME
Filed May 29, 1967
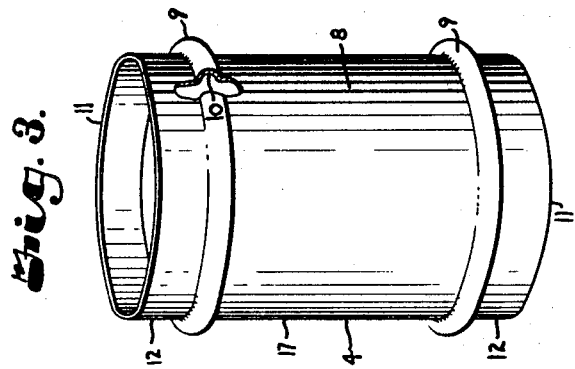
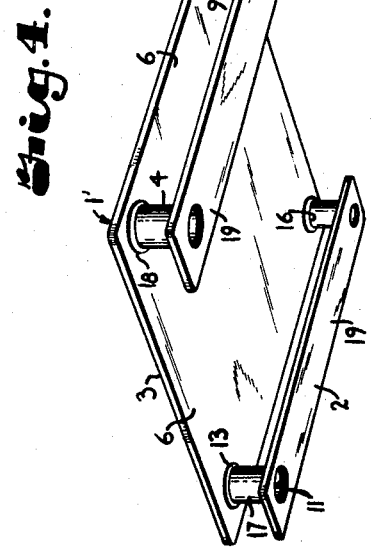
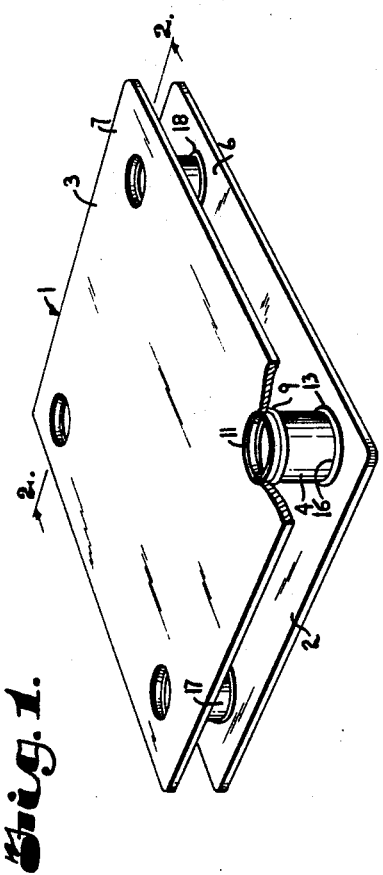
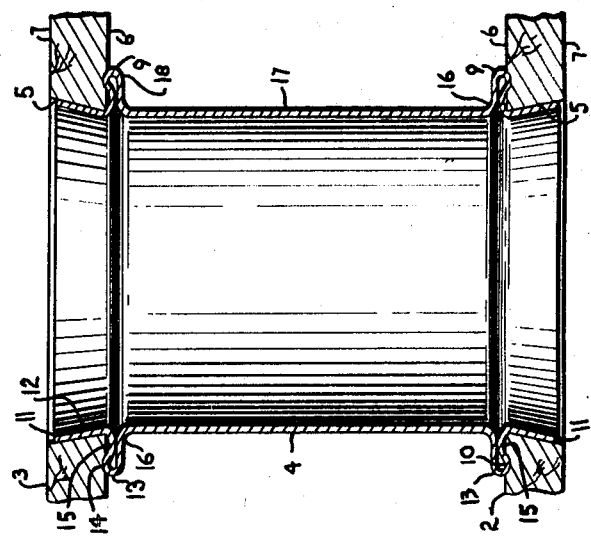
INVENTOR.
THOMAS L. HOWELL
BY
ATTORNEYS

United States Patent Office 3,393,647
Patented July 23, 1968

3,393,647
PALLET AND METHOD OF MAKING SAME
Thomas L. Howell, Shawnee and Adams, Kans.
(Box 5055, Parker Station, Kansas City, Mo. 66119)
Filed May 29, 1967, Ser. No. 642,125
6 Claims. (Cl. 108—52)

ABSTRACT OF THE DISCLOSURE

A load bearing pallet having a top deck member, a plurality of spaced and arranged columnar members, and a bottom deck or a plurality of spaced elongate plates. The top deck and the bottom deck or plates each have a plurality of vertically alignable outwardly flared openings therein. The columnar members space the top deck and the bottom deck or plates apart vertically and each of the columnar members has flared ends corresponding to and interlocking with the flared openings. A pair of spaced flanges intermediate the ends of each columnar member engage the top deck and the bottom deck or plates respectively and support same.

---

A method of making a pallet including cutting or drilling a plurality of opposed and vertically alignable openings which are outwardly flared from one surface of respective top and bottom deck members, cutting an elongate tubular member into a plurality of tubes with each tube having a predetermined length, forming a pair of spaced outwardly extending collar portions intermediate the ends of the tubes, inserting the opposed end portions of the tubes into the vertically aligned holes in the respective top and bottom deck members, expanding opposed end portions of the tubes corresponding to the flared openings, and collapsing the pair of spaced outwardly extending collar portions. The expanding of the opposed ends and collapsing of the collars are performed with the tubes in place in the flared openings by a pair of opposed cone shaped male dies.

Heretofore pallets constructed of wood were nailed or nailed and glued. Nails work out and the nail holes enlarge during use and exposed nail heads damage merchandise stored thereon. Many pallets have runners which prevent entrance of tying materials and truck forks from a pair of its sides thereby limting the flexibility of stowage arrangements and restricting the aisle arrangements for manipulating the loads. Metal pallets are expensive and paper pallets are not durable or adapted to supporting heavy loads.

The principal objects of the present invention are to provide a reusable load bearing pallet capable of supporting heavy loads during storage and transportation; to provide a pallet adapted to be lifted using mechanical pallet handling equipment from any of its sides; to provide a pallet adapted for easy passage of banding or other tying material through the pallet from any of its sides during securing the load to the pallet; to provide a strong, light weight, inexpensive, and durable pallet; to provide a pallet having a top and bottom deck spaced-apart vertically by and interlocked with a plurality of columnar members; to provide a pallet having outwardly flared opposed ends of the columnar members secured in position in outwardly flared openings in each deck member and having flanges engaging the respective deck members; to provide a method of making a pallet which is fast, simple, and accurate; to provide a method of making a pallet which is economical and increases production; to provide a method of making a pallet including drilling a plurality of openings which are outwardly flared from one surface of the respective deck members to the other, forming a pair of outwardly extending collar portions intermediate the ends of a plurality of tubes to hold the plates or decks in spaced relation to each other, inserting opposite end portions of said tubes into said deck members, expanding said opposite end portions of the tubes while in said deck members, and forming flanges respectively engaging said deck members; to provide a method of making a pallet having a plurality of columnar members each interlocking with the deck members; and to provide a method of making a pallet which eliminates the aforementioned difficulties.

Other objects and advantages of this invention will become apparent from the following description taken in connection with the accompanying drawings wherein are set forth by way of illustration and example certain embodiments of this invention.

FIG. 1 is a perspective view of a pallet embodying the features of the present invention with a part of the top deck broken away to show a columnar member therein.

FIG. 2 is a partial vertical sectional view through a columnar member taken on line 2—2, FIG. 1.

FIG. 3 is a perspective view of a columnar member prior to having opposed ends inserted into the respective deck members.

FIG. 4 is a perspective view of a modified form of the invention having a plurality of elongate plates forming the bottom deck.

Referring more in detail to the drawings:

The reference numeral 1 generally designates a load bearing pallet having a bottom deck or support means 2, a top deck member 3, and a plurality of columnar members 4 as shown in FIG. 1.

The pallet 1 is particularly adapted for storing and transporting material or merchandise. The vertical space between the top deck 3 and bottom deck 2 provides easy access for a fork lift or insertion of banding or other tying material used to secure the load thereto. The number of columnar members 4 varies from the four illustrated to nine arranged in three rows of three depending on the load to be supported. The horizontal spacing of the columnar members 4 is designed for the entrance of the prongs of a convetnional fork lift (not shown).

A plurality of bores or openings 5 are drilled and arranged in the top deck member 3 and in the bottom deck 2 to conform to the number of columnar members 4 in the pallet 1. Each of the openings 5 is flared from an interior face 6 to an exterior face 7 and it is preferred to use a flare angle of approximately twelve degrees (12°). The bores or openings 5 in the bottom deck 2 are arranged to be vertically alignable with the openings 5 in the top deck member 3.

Each of the columnar members 4 are of metal or other strong material such as plastic or the like and each is cut from an elongate tubular member thereby forming a plurality of tubes 8 of a predetermined length. A pair of vertically spaced, outwardly extending collar portions 9 are formed in the tubes 8 by expanding outwardly portions of the tubes 8. A recess 10 is formed in each of the collar portions 9 by the die (not shown) employed in outwardly expanding the tubes 8. The collar portions 9 each have a predetermined spacing from opposite ends 11 of the tubes 8 thereby forming opposed end portions 12 between the respective end 11 and the respective collar portion 9. The length of the end portions 12 is less than the thicknes of the respective top deck member 3 and the bottom support means 2.

The bottom deck 2 is placed on a work surface (not shown) with the interior face 6 upwards and one end portion 12 of the tubes 8 is placed in each of the flared openings 5 with the respective collar portions 9 engaging the interior face 6 thereof. The tubes 8 are in an upstanding columnar relation to the bottom support means 2. The top deck member 3 is then placed thereon so as to receive the respective opposite end portions 12 of the tubes 8 in the flared openings 5 with the respective collar portions 9 engaging the interior face 6 of the top deck member 3. The collar portions 9 support the top deck member 3 in vertical spaced apart relation with the bottom support means 2.

A pair of opposed male cone shaped dies (not shown) are then inserted in the opposite end portions 12 of each of the tubes 8 and pressure is applied to expand each end portion 12 into firm engagement with the respective flared opening 5. Pressure on the opposed male cone shaped dies is continued until the recess 10 in each collar portion 9 is collapsed to form an outwardly extending flange 13 which also firmly engages the interior face 6 of the respective top deck member 3 and the bottom deck 2. The flanges 13 engage and indent the respective interior face 6 as indicated at 14. The amount of pressure is preselected or predetermined depending on the material and wall thickness of the tubes 8.

The die employed to expand the collar portions 9 also creates a point of weakness in a portion 15 of the collar portion 9 adjacent each of the end portions 12. The portion 15 collapses and moves to engage a portion 16 of the collar portion 9 adjacent an intermediate or body section 17 of the tube 8. The collapsing of the recess 10 turns an outward portion 18 of the collar portion toward the respective interior face 6 as the portion 15 moves away from the respective top deck member 3 or the bottom deck means 2.

The pallet 1 thus formed is extremely strong when compared to the conventional wooden pallet especially in resistance to lateral forces due to the interlocking action of the flanges 13 with the respective interior faces 6 and the interlocking action of the expanded end portions 12 with flared openings 5. It should be noted that the ends 11 of the columnar members 4 do not extend to the respective exterior surface of the top deck member 3 and the bottom support means 2; therefore merchandise or other material placed on the pallet 1 will not contact the columnar members 4.

In the pallet 1 shown in FIG. 1 the top deck member 3 and the bottom deck or support means 2 are planar members of any suitable material such as plywood and the columnar member 4 are formed of circular metal tubing. The pallet 1 as shown in FIG. 1 is versatile when compared to conventional wooden pallets because either deck member 2 or 3 may serve as the load bearing deck.

FIG. 4 illustrates a modified form of pallet 1' wherein the bottom support means 2 consists of a plurality of elongate parallel plates 19 extending between and joining a plurality of the columnar members 4. Nesting pairs of pallets 1' are formed when the plates 19 of one pallet 1' are placed upward and the plates 19 of a second pallet 1' engage the interior face 6 of the top deck member 3 of the one pallet 1'. Nesting pairs of pallets 1' may be stored and transported in less vertical space than the pallets 1 illustrated in FIG. 1. Transportation charges are also reduced due to the reduced weight of the pallets 1' when compared to the pallets 1 shown in FIG. 1.

The modified pallet 1' may have two or three parallel plates 19 with the number of columnar members 4 in each varying from two to four depending on the material to be stored and the load to be supported thereon.

It is to be understood that while certain forms of this invention have been illustrated and described, it is not to be limited to the specific form or arrangement of parts or to the specific steps or sequence of steps herein described and shown except insofar as such limitations are included in the claims.

What I claim and desire to secure by Letters Patent is:
1. A load bearing pallet comprising:
(a) a plurality of planar bottom support members;
(b) a rigid planar top deck member, said top deck member being vertically spaced from said planar bottom support members;
(c) a plurality of bores in said bottom support members and in said top deck member, said bores in said bottom support members being axially aligned in registry with corresponding bores in said top deck member, said bores being outwardly flared from facing surfaces toward exterior surfaces of said bottom support members and said top deck member;
(d) a plurality of laterally spaced vertically directed columnar members between said bottom support members and said top deck member, said columnar members having end portions at opposite ends thereof, said end portions being engaged in an aligned pair of said bores and each of said opposite end portions being in position outwardly flared to a shape corresponding to said respective outwardly flared bores in the top deck member and in the respective bottom support member, said end portions having an in place length less than the thickness of said respective top and bottom support members, and
(e) axially spaced flange means frictionally engaging said facing surfaces of said top deck member and said bottom support members and supporting said top deck member against movement toward said bottom support members whereby said flared ends and said flange means cooperate with said bottom support members and said top deck member to maintain said spaced relation.

2. The load bearing pallet as set forth in claim 1 wherein:
(a) said axially spaced flange means are in position collapsed outwardly extending enlarged collar portions of a tubular member, and
(b) said collapsed collar portions are indented into facing surfaces of said top deck member and said bottom support members whereby the pallet resists lateral forces.

3. The load bearing pallet as set forth in claim 2 wherein:
(a) said columnar members are tubular members,
(b) said pair of axially spaced collapsed collar portions are integral with said columnar members, and
(c) said flared opposite ends and said integral flanges being indented into said top deck member and said bottom support members cooperate to interlock said columnar members with said top deck member and said bottom support members whereby the pallet resists lateral forces.

4. A load bearing pallet comprising:
(a) vertically spaced apart top and bottom deck members, said deck members each being rigid planar members;
(b) a plurality of axially aligned outwardly flared bores in said top and bottom deck members, said flared bores being outwardly flared from facing surfaces toward exterior surfaces of said top and bottom deck members;
(c) a plurality of laterally spaced vertically directed tubular columnar members each having opposite end portions engaged in said respective axially aligned flared bores in said top and bottom deck member respectively, said end portions being in position outwardly flared to a shape corresponding to and frictionally engaging said respective flared bores, said flared end portions having an in place length less than the thickness of said top and bottom deck members whereby said respective exterior surfaces are smooth and obstruction free; and
(d) axially spaced apart flanges integral with said columnar members and engaging said respective facing surfaces of said deck members, said flanges being in position collapsed outwardly extending collar portions enlarged in said columnar members, prior to being collapsed said collar portions each having an internal recess between radially outwardly extending axially spaced portions, said recess being closed and said axially spaced portions being in engagement with each other and said collar portions being indented into said facing surfaces of said top deck member and said bottom deck member respectively after collapsing of said collar portions whereby the combination of said frictional engagement between said flared end portions and said respective flared bores and said engagement between said axially extending portions of said collar portions and said collar portions being indented into said respective facing surfaces of said deck members cooperate to interlock said columnar members in said deck members thereby resisting vertical loads and lateral forces tending to produce relative movement between said top and bottom deck members.

5. A method of making a joint between a tubular member and a planar deck member, said tubular member having a radially outwardly extending hollow collar portion therearound, said deck member having a bore outwardly flared from one surface thereof, said bore having a minimum diameter at said one surface greater than a diameter of said tubular member but less than a diameter of said collar portion, said method comprising the steps of:
  (a) inserting one end of said tubular member into said bore,
  (b) expanding said tubular member one end into firm engagement with the wall of said bore, and
  (c) axially collapsing said hollow collar portion simultaneously with expanding said tubular member one end.

6. The method of making a joint as set forth in claim 5 wherein said tubular member has a predetermined length and a pair of axially spaced collar portions intermediate the ends thereof and opposite end portions beyond said collar portions, said method including the steps of:
  (a) inserting said opposite end portions of said tubular member into said flared bores in spaced apart deck members and engaging said pair of collar portions with facing surfaces of said deck members, and
  (b) simultaneously applying coaxial continuous pressure at each of said end portions until said end portions flare outwardly into a cone shape having firm engagement with respective bore walls and said pair of hollow collar portions collapse whereby said opposed end portions move toward each other and said collar portions are deformed to indent into said facing surfaces.

References Cited
UNITED STATES PATENTS

| | | | |
|---|---|---|---|
| 2,706,099 | 4/1955 | Whalley | 108—53 |
| 2,832,130 | 4/1958 | Harvey | 285—382 |
| 2,889,867 | 6/1959 | Phillips | 285—382 XR |
| 2,930,560 | 3/1960 | Carnwath et al. | 108—56 |
| 3,124,627 | 3/1964 | Hood | 264—45 |
| 3,177,271 | 4/1965 | Slayman | 264—45 |
| 3,199,469 | 8/1965 | Sullivan | 108—53 |
| 3,326,006 | 6/1967 | Mount | 285—382 |

BOBBY R. GAY, *Primary Examiner.*

G. O. FINCH, *Assistant Examiner.*